United States Patent [19]
Elsner et al.

[11] Patent Number: 4,669,027
[45] Date of Patent: May 26, 1987

[54] POWER LINE SURGE PROTECTOR WITH INTERNAL SHIELDING

[75] Inventors: Hans Elsner, Bremen; Peter Prendel, Weyhe, both of Fed. Rep. of Germany

[73] Assignee: U.S. Philips Corporation, New York, N.Y.

[21] Appl. No.: 693,915

[22] Filed: Jan. 23, 1985

[30] Foreign Application Priority Data

Jan. 26, 1984 [DE] Fed. Rep. of Germany ....... 3402581

[51] Int. Cl.⁴ .............................................. H02H 9/04
[52] U.S. Cl. .................................... 361/111; 361/117; 361/424
[58] Field of Search ............... 361/111, 112, 117, 118, 361/302, 424

[56] References Cited

U.S. PATENT DOCUMENTS

| | | | |
|---|---|---|---|
| 3,129,396 | 7/1959 | Germain et al. | 361/424 |
| 3,992,652 | 11/1976 | Blaisdell et al. | 361/118 |
| 4,023,071 | 5/1977 | Fussell | 361/111 X |
| 4,306,205 | 12/1981 | Ito et al. | 361/302 X |
| 4,340,921 | 7/1982 | Lasseter | 361/111 X |
| 4,419,711 | 12/1983 | Seguin | 361/111 |
| 4,438,365 | 3/1984 | Atkinson | 361/111 X |
| 4,494,095 | 1/1985 | Noji et al. | 361/424 X |
| 4,563,720 | 1/1986 | Clark | 361/111 X |

Primary Examiner—A. D. Pellinen
Assistant Examiner—A. Jonathan Wysocki
Attorney, Agent, or Firm—David R. Treacy

[57] ABSTRACT

To protect electronic apparatus against voltage peaks, in particular those generated by nuclear electromagnetic pulses (NEMP), several lowpass filters with voltage-limiting elements are interposed in the system of lines entering from outside, and are built into a housing with an electrically conducting inside wall and divided into several compartments. The lowpass filters flatten out the leading edge of an entering overvoltage peak to such an extent that the last voltage-limiting devices in the series circuit are actuated at the proper time so as to effectively limit the overvoltage peaks, while the incorporation of the electrical elements in the housing with separated compartments avoids overcoupling of high-frequency signal components.

10 Claims, 4 Drawing Figures

POWER LINE SURGE PROTECTOR WITH INTERNAL SHIELDING

BACKGROUND OF THE INVENTION

The invention relates to an arrangement for suppressing over-voltage peaks on conductors, especially power line conductors, leading into an electronic apparatus provided with a closed electrically conducting surface; and more particularly to such an arrangement in which, arranged in a housing, there are voltage-limiting elements connected between the lines mutually and similar elements connected between the lines individually and a common reference point, preferably the housing, together with lowpass filters consisting of series inductances and parallel capacitances.

Overvoltage peaks on lines can stem from various causes. In the case of power supply lines in particular, such peaks result from switching transients produced by other connected users or by the effects of lightning. Because of the different causes, overvoltage peaks of different shape or waveform are normally generated, and those with steep leading edges are the most difficult to suppress since the actuation of practically all voltage-limiting devices takes place with a certain delay. Particularly critical in this respect are overvoltage peaks generated by NEMP, i.e. by nuclear electromagnetic pulses caused by explosions at a great height. Such overvoltage peaks have edge steepnesses of less than 10 ns at very high energies. If such overvoltage peaks are not adequately suppressed, they can cause considerable damage in electronic apparatus built up from modern semiconductor components.

For the suppression or reduction of overvoltage peaks it is common practice to use voltage-limiting components in combination with lowpass filters consisting of series inductances and parallel capacitances. Normally a combination of this kind is used for each line. In the case of overvoltage peaks with very steep edges, such as those triggered by NEMP, the speed of response of conventional voltage-limiting devices is insufficient, however, to achieve a limitation of the overvoltage peaks to values that can be tolerated by modern semiconductor components, at the output of a combination consisting of a voltage-limiting component and a lowpass filter. An improvement could be achieved by connecting several of such combinations in series, but in that case high-frequency coupling between input and output would make it difficult to achieve adequate limitation of the overvoltage peaks.

SUMMARY OF THE INVENTION

It is an object of the invention to present an arrangement of the kind mentioned at the beginning, permitting reliable limitation of overvoltage peaks showing very high energy components even at very high frequencies.

In the invention this purpose is fulfilled in that the housing contains several lowpass filters connected in series in separated compartments arranged one behind the other. At least the compartment nearest to the apparatus is sealed off in a high-frequency proof manner from the preceding compartments, the output end of each lowpass filter being connected via an overvoltage conductor at least with the reference point. The housing is electrically conductive at least over the whole of its inside surface, and the fixing elements of the housing are so designed as to effect a good electrical transition from the conductive inside surface to the conductive outer surface of the electronic apparatus.

The principle underlying the invention is to spread out the leading edge of the overvoltage peaks to longer rise times that enable conventional voltage-limiting elements to respond effectively. For this purpose the lowpass filters on the line side must be suitable for high frequencies in particular, while on the other hand an unduly sharp limiting of overvoltages on the line side is not needed. This limiting need not take place until the vicinity of the output of the arrangement is reached. The outputs of the lowpass filters can also be interconnected via other overvoltage conductors. By virtue of the construction consisting of several compartments, at least in part largely electromagnetically screened from each other, in which the voltage-limiting elements and the lowpass filters are contained in circuits one after the other, overcouplings from the output to the outputs avoided to the maximum extent possible.

An embodiment of the invention which is largely based on this principle is characterized in that in the compartment on the incoming power line side each line terminal or input is connected only to one end of a first series inductor, the other ends of the first series inductors are connected via first capacitors at least to the reference point; via spark gaps to each other, and to the reference point, and with the one end of safety fuses. The spark gaps are in the form of a lateral wall separating two neighboring compartments. The other ends of the safety fuses are connected via overvoltage conductors to the reference point and to each other, as well as to the inputs of a line filter containing further series inductors and further parallel capacitors and metallically completely encapsulated to be high-frequency proof. The encapsulation of the line filter forms the termination of the compartment on the side nearest to the apparatus, in which the outputs of the line filter are connected with each other via varistors and with feed-through capacitors fitted in openings in the housing and leading into the electronic apparatus, forming device outputs. In this manner the leading edges of the overvoltage peaks are flattened stepwise very effectively. To optimize the flattening, the line filter, which may consist of a standard component, is placed in the circuit at a position in which the energies in the highest frequency ranges are already strongly reduced.

BRIEF DESCRIPTION OF THE DRAWING

An embodiment of the invention is described below with reference to the appended drawings.

DESCRIPTION OF THE PREFERRED EMBODIMENTS

Figure 1:
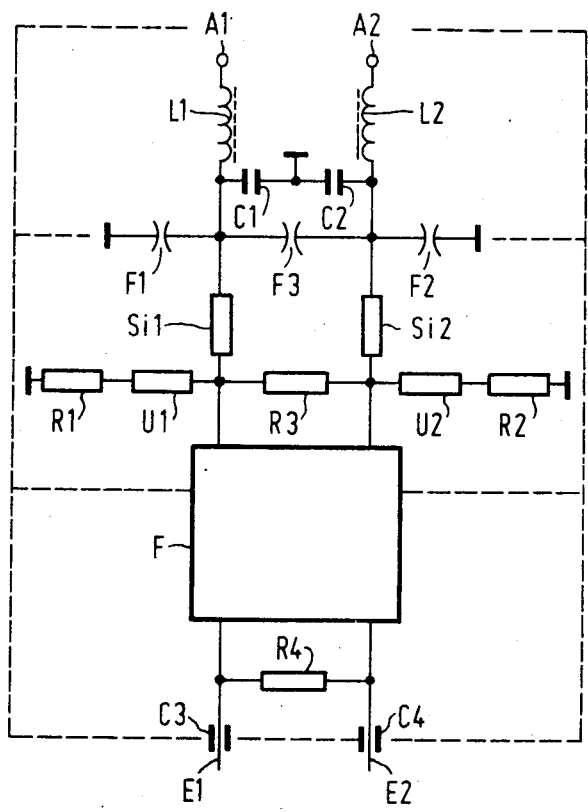
FIG. 1 is a schematic diagram of the electrical circuit of the arrangement.

In FIG. 1 the line terminals A1 and A2, to which a power supply cable from outside is connected, each lead to a first series inductor L1 and L2. Although these contain an iron core, to increase the inductance, the magnetic circuit is interrupted by air gaps, thus avoiding saturation effects.

The other ends of the inductors L1 and L2 are connected via capacitors C1 and C2 with the reference point. These capacitors must be rated for relatively high voltages. The other ends of the inductors L1 and L2 are connected via spark gaps F1 and F2 with the reference point, and via a spark gap F3 with each other, with a view to direct suppression of impermissible voltage differences between the two lines.

Finally the other ends of the inductors L1 and L2 lead via safety fuses Si1 and Si2 to two junction points which are interconnected via a varistor R3. Each junction is also connected to a respective overvoltage conductor U1 and U2 which has a relatively low actuation voltage. The overvoltage conductors U1 and U2 do not go directly to the reference point but are series connected to further varistors R1 and R2 which, in the normal actuation case, limit the hold current of the overvoltage conductors U1 and U2.

The junction points further lead to the inputs of a line filter F, which is a finished commercially available component, for example of the type "CORCOM 3W1A" from the firm CORCOM GmbH, Neurid, and which is likewise built up from series inductors and parallel capacitors, contained in an electromagnetically screened housing.

The outputs of this filter F are interconnected via a further varistor R4 and are connected to feed-through capacitors C3 and C4 which form the terminal points or outputs E1 and E2 leading to the electronic apparatus that follows. The feed-through capacitors C3 and C4 lead through the wall of an electromagnetically screened housing, indicated by dashed lines, which contains all the components described. This housing is divided into three compartments, as indicated by the dashed lines leading to the line filter F and to the spark gaps F1 and F2.

Figures 2A, 2B:
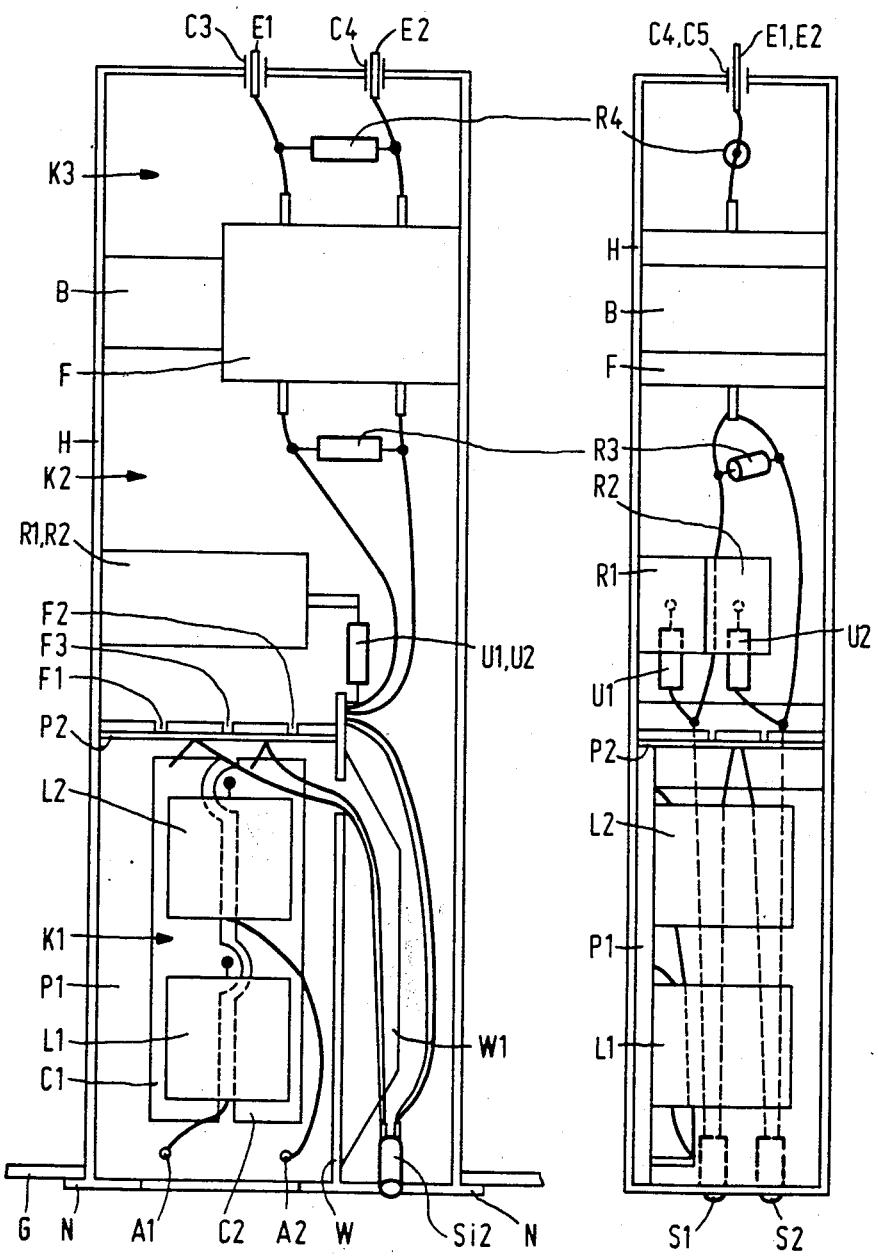
FIGS. 2a and 2b are a plan view and side view of the arrangement.

FIGS. 2a and 2b show the spatial arrangement of the electrical elements of FIG. 1 in a housing H. The terminals A1 and A2, near which the housing H has an opening for the cable entering from outside, are arranged on an insulating plate P1, which forms the base of the compartment K1. This compartment K1 is defined in part by the inner side wall W and a further plate P2 of insulating material. The surface of the plate P1 is partly covered with two electrically conducting sheets C1 and C2 which, in conjunction with a sheet on the back of the plate P1 or on the base of the housing H, constitute the corresponding capacitors C1 and C2. Also fixed to the plate P1 are two inductors L1 and L2. The terminals at one side of the inductors L1 and L2 are connected with the terminals A1 and A2, and the terminals at the other side of these inductors are connected, partly via the electrically conducting sheets forming the capacitors C1 and C2, with three spark gaps F1 to F3, whose mechanical construction will be exaplained below with reference to FIG. 3.

From the spark gaps separate leads go to safety fuses Si1 and Si2, which are arranged on the front of the housing H next to the terminals A1 and A2, but separated from these by the wall W. From the other connections of these safety fuses Si1, Si2 two cables, which are separated by a metal wall W1 from the leads going to the fuses, are connected with two bonding pads which are fixed respectively to the plate P2 and insulated, to the wall W. From each of these two bonding pads an overvoltage conductor U1, U2 leads to a varistor R1, R2, in the form of a block fixed to the side wall of the housing H and thereby conductively connected with it. Also leading from the bonding pads are lines to the connections of a line filter F which are interconnected at a short distance from or at these connections by a further varistor R3. This line filter F is encapsulated practically high-frequency proof and forms the high-frequency screen between the compartment K2 and the compartment K3, the encapsulation of the line filter F being mechanically sealed and electrically conducting to the walls of the housing H. This may possibly be arranged by means of resilient metal strips. Larger spacings, constituted by the dimensions of the line filter F and the inner space of the housing H, can be filled up by metallic walls or, as illustrated in FIG. 2, by a solid metal block B.

The output terminals of the line filter F are located in compartment K3 and are interconnected by a further varistor R4 and connected by lines to feed-through capacitors C3 and C4 which are inserted in openings in the housing H. The outside surfaces of the feed-through capacitor are electrically connected with the housing, preferably by bonding pads. The outer connections E1 and E2 of these capacitors C3 and C4 form the device outputs or terminals leading into the electronic apparatus in which the housing H1 is contained.

The outer, likewise electrically conducting wall G of the electronic apparatus is mechanically and also electrically connected by a flanged edge N to the housing H, so that the conducting inner wall of the housing H forms a good electrical transition to the outer surface of the electronic apparatus G and represents electrically an indentation in the electrically conducting surface of the electronic apparatus.

Figure 3:
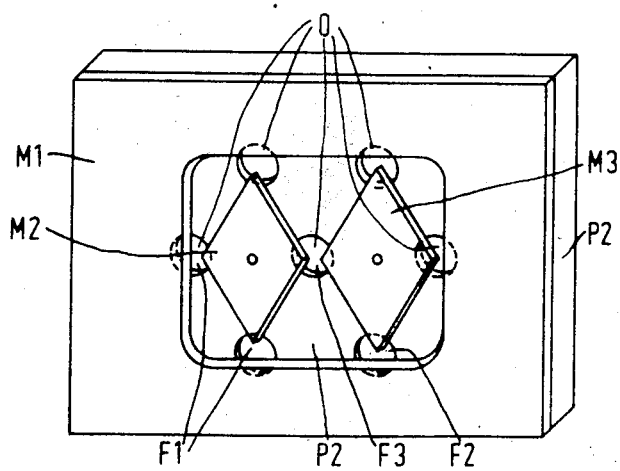
FIG. 3 shows a possible embodiment of the spark gaps.

The construction of the spark gaps F1, F2 and F3 on the insulating plate P2 is shown in more detail in FIG. 3. It is covered with a first metal surface M1, which can extend to the edge of the plate P2 and has an opening in the middle. Fitted in this opening are two lozenge-shaped metal surfaces M2 an M3 which are insulated from each other and from the surrounding metal surface. The three corner points of the metal surface M2, adjacent those of the metal surface M1, form the spark gap F1, and the three corner points of the metal surface M3, adjacent the surrounding metal surface M1, form the spark gap F2. The adjacent corner points of the two metal surfaces M2 and M3 form the spark gap F3. Near the spark gaps F1, F2 and F3, openings or holes O are made in the insulating plate P2, so that the spark gaps F1, F2 and F3 are surrounded only by air and no creep paths can form on the insulating plate P2. If the insulating plate P2 is sufficiently thick, the holes O can also be sunk into the surface. The metal surfaces M1, M2 and M3 can be covered with an insulating material on the surface turned away from the insulating plate P2, which may also have openings near the spark gaps F1, F2 and F3.

The metal surfaces M2 and M3 are provided with openings that pass through the insulating plate P2 and in which are soldered the leads from the capacitor surfaces C1 and C2 and the leads to the safety fuses Si1, Si2. The metal surface M1 is electrically connected in a suitable manner with the conducting inner surface of the housing H in FIG. 2. This arrangement of the spark gaps thus forms a partial electromagnetic screen separating the two compartments K1 and K2 in FIG. 2.

For example, and not by way of limitation, the circuit of FIG. 1 typically may include the following:

| | |
|---|---|
| Voltage between A1 and A2, and between E1 and E2 | approx. 220 Volts A.C.; |

-continued

| | |
|---|---|
| L1, L2 | 118 micro-henries, high voltage proof, Valvo type E/42/21/15 -00-3C8 with 0.5 mm air gap; |
| C1, C2 | approx. 100 picofarads; |
| Si1, Si2 | Wickman type 19601; |
| U1, U2 | Siemens type S1 A 230 Q 69 - X 801; |
| R1, R2 | Siemens type B 32 K 150 Q 69 33 24; |
| R3, R4 | Siemens type S 20 K 150 Q 69 32 29; |
| C3, C4 | Erie type 1202 - 005. |

What is claimed is:

1. A device for suppressing overvoltage peaks on inputs leading into an electronic apparatus which has a closed electrically conducting outer surface, comprising:
    a housing,
    first and second inputs and first and second outputs,
    first and second circuit means respectively connecting the first and second inputs to the first and second outputs, said first and second circuit means each comprising a series inductance,
    a plurality of voltage limiting elements respectively connected between said first and second circuit means, and between a common reference point and each of said means respectively, and
    at least one parallel capacitance and one low-pass filter,
    characterized in that said housing is divided into a plurality of compartments arranged in series between said inputs and said outputs, at least the output-end compartment of said series being sealed so as to be high-frequency proof with respect to the preceding compartments; and said housing has an inside surface which is electrically conductive over the entire inside surface, and has a fixing element for attaching the device to one said electronic apparatus, said element being arranged to make good electrical connection between said inside surface and said outer surface,
    the device comprises a plurality of low-pass filters connected in series, and disposed in different ones of said compartments,
    each low-pass filter has first and second filter outputs each being part of a respective circuit means, said series inductances each being part of one of said low-pass filters, and
    the device further comprises respective said limiting elements connected between the outputs of each filter respectively.

2. A device as claimed in claim 7, characterized in that said housing comprises at least three said compartments, one being an input-end compartment,
    said series inductances of said ones of said one low-pass filters are disposed in said input-end compartment, each inductance having one end connected solely to a respective input,
    the device comprises at least two said parallel capacitances, being first capacitors, and three spark gaps; the other end of each of said series inductances being connected via the respective first capacitors to said reference point, via one of said spark gaps to each other, and via respective ones of said spark gaps to said reference point, and to respective one ends of said safety fuses, each of said safety fuses forming part of a respective one of said circuit means;
    said spark gaps are formed as part of a lateral wall separating two adjoining compartments of said series,
    said limiting elements include an overvoltage conductor connected between the other ends of said safety fuses, and two overvoltage conductors connected respectively between said other ends and said reference point,
    said plurality of low pass filters further includes a line filter including further series inductances and further lateral capacitances, metallically encapsulated so as to be completely high-frequency proof, the metallic encapsulation of said line filter forming a termination of the output end compartment at the side nearest said apparatus, and
    said device further comprises at least one varistor, and each of said means respectively comprises a feed-through capacitor, said varistor being connected between the filter outputs of said line filter, and said feed-through capacitors being fitted in openings formed in the housing, leading into the electronic apparatus, and being connected between said line filter outputs and the device outputs respectively.

3. A device as claimed in claim 2, characterized in that said first capacitors are formed by respective conducting surfaces, each said capacitor being formed by respective surfaces disposed one to each side of a plate of insulating material which at least partially bounds said input-end compartment and abuts said housing inside surface.

4. A device as claimed in claim 3, comprising two further varistors, each connected in series connection between said reference point and a respective one of said overvoltage conductors.

5. A device as claimed in claim 4, characterized in that said safety fuses are disposed beside said inputs, and said device comprises an electromagnetic screen at least partially screening said fuses from said inputs.

6. A device as claimed in claim 5, characterized in that said spark gaps are each formed at least in part by one of a plurality of flat metallic parts disposed in a plane, at least two of said parts having respective areas that form a respective sharp corner, said corners being ends of respective spark gap paths.

7. A device as claimed in claim 2, comprising two further varistors, each connected in series connection between said reference point and a respective one of said overvoltage conductors.

8. A device as claimed in claim 2, characterized in that said safety fuses are disposed beside said inputs, and said device comprises an electromagnetic screen at least partially screening said fuses from said inputs.

9. A device as claimed in claim 2, characterized in that said spark gaps are each formed at least in part by one of a plurality of flat metallic parts disposed in a plane, at least two of said parts having respective areas that form a respective sharp corner, said corners being ends of respective spark gap paths.

10. A device as claimed in claim 1, characterized in that said first capacitors are formed by respective conducting surfaces, each said capacitor being formed by respective surfaces disposed one to each side of a plate of insulating material which at least partially bounds said input-end compartment and abuts said housing inside surface.

* * * * *

UNITED STATES PATENT AND TRADEMARK OFFICE
CERTIFICATE OF CORRECTION

PATENT NO. : 4,669,027
DATED : May 26, 1987
INVENTOR(S) : HANS ELSNER ET AL

It is certified that error appears in the above-identified patent and that said Letters Patent is hereby corrected as shown below:

IN THE CLAIMS

Claim 2, line 9 after "capacitors," insert --two safety fuses--

Claim 2, line 1 change "7" to --1--

Signed and Sealed this

Nineteenth Day of April, 1988

Attest:

DONALD J. QUIGG

Attesting Officer — Commissioner of Patents and Trademarks